United States Patent
Wedel et al.

(10) Patent No.: US 9,088,180 B2
(45) Date of Patent: Jul. 21, 2015

(54) LOAD SHED CONTROL MODULE FOR USE WITH ELECTRICAL GENERATOR

(75) Inventors: Francis X. Wedel, Lake Mills, WI (US);
Jacob J. Thomas, East Troy, WI (US);
Steven J. Wilcox, Delafield, WI (US);
Greg Wischstadt, Wales, WI (US);
Carmine Forte, Eagle, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 631 days.

(21) Appl. No.: 13/448,743

(22) Filed: Apr. 17, 2012

(65) Prior Publication Data

US 2013/0270908 A1    Oct. 17, 2013

(51) Int. Cl.
*H02J 3/14* (2006.01)
*H02J 9/08* (2006.01)
*H02H 3/00* (2006.01)
*H02J 13/00* (2006.01)

(52) U.S. Cl.
CPC ...... *H02J 3/14* (2013.01); *H02J 9/08* (2013.01); *H02J 13/0006* (2013.01); *Y02B 70/3225* (2013.01); *Y02B 70/3291* (2013.01); *Y02B 90/222* (2013.01); *Y04S 20/12* (2013.01); *Y04S 20/222* (2013.01); *Y04S 20/248* (2013.01)

(58) Field of Classification Search
USPC .......................................................... 307/64
See application file for complete search history.

(56) References Cited

U.S. PATENT DOCUMENTS

| | | | |
|---|---|---|---|
| 4,324,987 | A | 4/1982 | Sullivan et al. |
| 5,536,976 | A | 7/1996 | Churchill |
| 6,172,432 | B1 | 1/2001 | Schnackenberg et al. |
| 6,510,369 | B1 | 1/2003 | Lacy |
| 6,813,525 | B2 | 11/2004 | Reid et al. |
| 7,356,384 | B2 | 4/2008 | Gull et al. |
| 2005/0216131 | A1 | 9/2005 | Sodemann et al. |
| 2006/0229768 | A1 | 10/2006 | Chassin et al. |
| 2007/0010916 | A1* | 1/2007 | Rodgers et al. ............... 700/295 |
| 2007/0021874 | A1 | 1/2007 | Rognli et al. |
| 2007/0222295 | A1 | 9/2007 | Wareham et al. |
| 2008/0258558 | A1 | 10/2008 | Lathrop et al. |
| 2011/0298285 | A1 | 12/2011 | Lim et al. |

FOREIGN PATENT DOCUMENTS

| | | |
|---|---|---|
| JP | 06-335171 | 12/1994 |
| JP | 07-295626 | 11/1995 |
| WO | 0137392 | 5/2001 |

OTHER PUBLICATIONS

"Technical Manual—RTS Automatic Transfer Switch", 25 pages, undated, Generac Power Systems, Inc., P.O. Box 8, Waukesha, WI 53187.

(Continued)

*Primary Examiner* — Robert Deberadinis
(74) *Attorney, Agent, or Firm* — Boyle Fredrickson, S.C.

(57) ABSTRACT

A load management apparatus for use with an electrical system being powered by an electrical generator selectively adds and sheds loads on the electrical generator to prevent overloading of the electrical generator. The load management apparatus learns the load profile for each load during a learning mode and executes one or more load shed processes to control which electrical loads are loading the electrical generator.

19 Claims, 4 Drawing Sheets

(56) References Cited

OTHER PUBLICATIONS

"Instruction Manual, Nexus Remote Monitor", Revision A, Jul. 23, 2010, 12 pages, Generac Power Systems, Inc., P.O. Box 8, Waukesha, WI 53187.

"Instruction Manual, Wireless Display System", Revision A, Jun. 28, 2010, 16 pages, Generac Power Systems, Inc., P.O. Box 8, Waukesha, WI 53187.

* cited by examiner

LOAD SHED CONTROL MODULE FOR USE WITH ELECTRICAL GENERATOR

FIELD OF THE INVENTION

The present invention relates generally to load management systems, and in particular, to an apparatus for automatically adding and shedding electrical loads on an electrical generator when the electrical generator is supplying electrical power to an electrical system, such as when normally-available utility power is interrupted or otherwise unavailable.

BACKGROUND OF THE INVENTION

Electrical generators are used in a wide variety of applications. Typically, an electrical generator operates in a stand-by mode wherein the electrical power provided by a utility is monitored such that if the commercial electrical power from the utility fails or is otherwise interrupted for a certain period of time, the engine of the electrical generator is started, either automatically or manually by a customer, causing the electrical generator to supply emergency or backup electrical power. More particularly, the engine drives an alternator to provide electrical current to power selected electrical loads ("electrical circuits") that are connected to the electrical generator, which is typically through a dedicated electrical panel, i.e., a transfer panel.

When the electrical power generated by the alternator reaches a predetermined voltage and frequency desired by the customer, the transfer switch transfers the load imposed by the customer from the commercial power lines to the electrical generator. The electrical generator then supplies electrical power to selected loads, which are typically deemed to be critical loads, such as HVAC equipment, refrigerator(s), lighting, sump pumps, well pumps, and, if applicable, medical equipment.

The 2008 edition of the United States National Electrical Code (NEC 2008) required an increase in the ratio of rated generator output to maximum possible loading on the electrical generator. Thus, to meet the NEC stated supply/load requirements, larger electrical generators than previously needed are now required or the generator-connected loads must be limited. Larger electrical generators are generally more costly in acquisition and operating costs, have a larger physical footprint, and are noisier. It is often desirable to hide or otherwise soften the appearance of the electrical generator, such as when used to provide emergency or backup power to a home. Similarly, many homeowners' associations have noise emission requirements that ultimately limit the size of electrical generator that can be used. So, in general, there is a demand for physically smaller electrical generators. However, reducing the physical size of the electrical generator typically also results in a reduction in the rated power output of the electrical generator, which can place a limit on the number of electrical loads that are fed by the electrical generator during utility power interruption. Many users, however, prefer to power as many electrical loads as possible even when utility power is unavailable. With NEC 2008, the number of generator-connectable loads is further limited.

One of the challenges faced by engineers in designing smaller electrical generators without sacrificing power output is preventing overloading of the electrical generator when it is being used to supply electrical power to the generator-connected loads during utility power interruption or failure. One solution has required an electrician to hardwire only those loads, through the transfer panel, that the electrical generator is capable of supporting. Thus, for this traditional wired approach, if the electrical generator was sized to supply 200 Amps of output, for example, the total amperage draw of the electrical loads connected to the electrical generator through the transfer panel would be limited to approximately 200 Amps. NEC 2008 allows consumers to have their power usage monitored, such as for thirty days, with recordings for peak power usage. This data can then be used to select an appropriately sized generator. However, this process is typically expensive and will often result in the consumer needing or wanting a larger sized generator.

Another type of solution is the use of a control module, such as that described in U.S. Publication No. 2007/0222295, which adds and sheds loads based on the demand placed on the electrical generator. With this microprocessor-based model, if a given load is turned off or is otherwise not loading the electrical generator, the control module adds a load on the electrical generator. Similarly, if the current draw of the online loads exceeds the rated output of the electrical generator, or some other value representative of an overload condition, the control module provides command signals to one or more remotely controllable switches to shed ("electrically disconnect") one or more electrical loads until the loading on the electrical generator is matched to or below the rated output of the electrical generator. The plurality of loads are typically prioritized which sets an order by which the loads are added or shed, i.e., remotely controllable switches are switched. In this regard, if a new load is added to the loads to be powered by the electrical generator, the loads must be re-prioritized. This re-prioritization typically requires an electrician to rewire how the loads are connected to the transfer panel or change the association of the remotely controllable switches and the loads so that the control module connects and disconnects the loads in the right order.

SUMMARY OF THE INVENTION

The present invention is directed to a load management apparatus for use with an electrical system being powered by an electrical generator, and that selectively adds and sheds loads on the electrical generator to prevent overloading of the electrical generator. The load management apparatus learns the load profile for each load during a learning mode and executes one or more load shed processes to control which electrical loads are loading the electrical generator. The load management apparatus is not required to add or shed loads based on a preset order of preference. In this regard, the load management apparatus is not limited to a prewired arrangement that requires rewiring by a skilled professional, such as a licensed electrician, when a new load is added to the electrical system.

The present invention may be embodied in a power management module that interfaces with the electrical system of a home, office building, or the like and an electrical generator. In this embodiment, the power management module includes a first input that receives a power supply value of electrical power available from the electrical generator and at least one second input that receives electrical load values for the plurality of electrical loads. The module further has a processor that is programmed to adaptively add and shed loads from receiving electrical power from the electrical generator to maintain loading on the electrical generator at or below the power supply value.

The invention may also be embodied in a load management apparatus for controlling the loading placed on an electrical generator by a plurality of electrical loads. The apparatus comprises a current sensing device adapted to measure current output of an electrical generator and a plurality of remotely controllable switching devices operative to switchably connect the plurality of electrical loads to the electrical generator. A controller is programmed to provide switching signals to the remotely controllable switching devices to individually connect the electrical loads to the electrical generator so that a total loading placed on the electrical generator by the connected electrical loads does not exceed a preset overload value. Additionally, the controller is programmed to add or shed electrical loads so that the preset overload value is not exceeded and the total loading on the electrical generator is substantially at a preset efficiency value.

The invention may also be embodied in a method of managing electrical power draw on an electrical generator. In one embodiment, the method includes individually prioritizing a plurality of electrical loads based on electrical loading placed by each of the plurality of electrical loads on a utility power supply that normally supplies electrical power to the plurality of electrical loads. The method, upon an interruption of the utility power supply, electrically connects the plurality of electrical loads to the electrical generator so that the electrical generator can supply electrical power to the plurality of electrical loads. And, if a loading on the electrical generator exceeds a preset loading value, the method electrically isolates the plurality of electrical loads from the electrical generator and individually reconnects the plurality of electrical loads to the electrical generator based on an order of preference from the prioritization of the plurality of electrical loads. In this regard, the plurality of electrical loads are reconnected in the order of preference until the loading by the electrical loads as the electrical loads are being connected reaches the preset loading value.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode presently contemplated of carrying out the invention.

In the drawings.

DETAILED DESCRIPTION OF THE DRAWINGS

Figure 1:
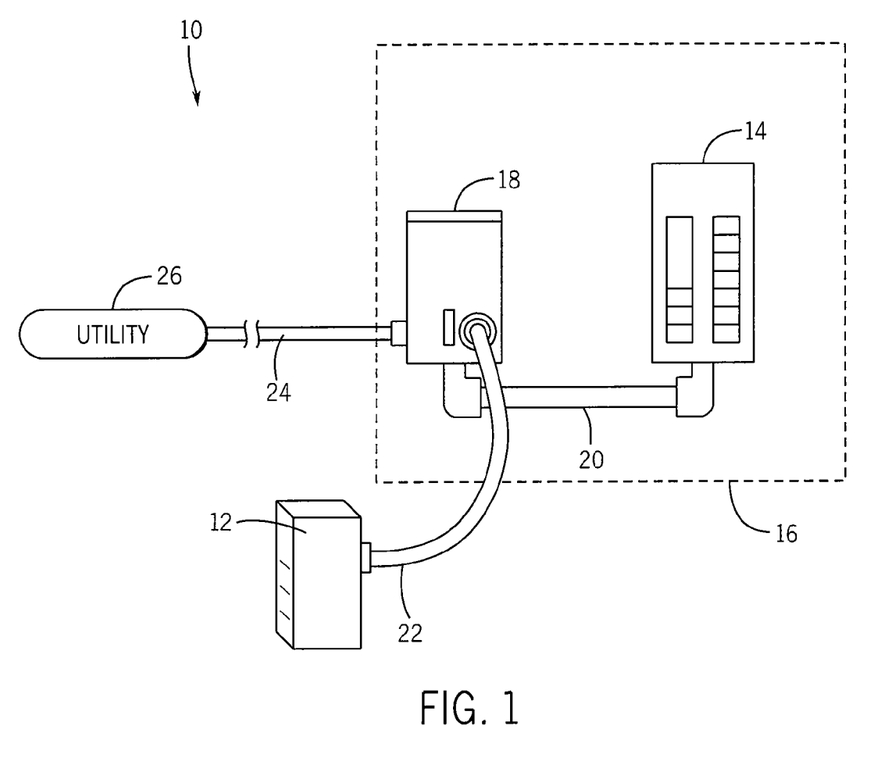
FIG. 1 is a schematic representation of a standby or emergency power supply system that supplies electrical power to an electrical system during interruption of utility power.

FIG. 1 shows a power inlet arrangement 10 for interconnecting an electrical generator 12 with a main electrical panel or load center 14 located in the interior of a building 16, e.g., home. In the power inlet arrangement of FIG. 1, a transfer switch 18 is mounted adjacent main panel 14, and is interconnected therewith via a series of wires enclosed by a conduit 20 extending between main panel 14 and transfer switch 18.

A first conduit 22 extends from the electrical generator 12 to the transfer switch 18. A second conduit 24 extends from a utility power supply 26 to the transfer switch 18. The first and second conduits 22, 24 connect to the transfer switch 18 in a conventional manner and thus will not be described in further detail herein.

In a preferred embodiment, the electrical generator 12 is caused to run automatically upon the interruption of utility power. In this regard, a customer is not required to manually start the electrical generator 12 to commence the supply of standby electrical power. As known in the art, when utility power is interrupted, the transfer switch 18 transmits a signal to the electrical generator 12 which causes the electrical generator 12 to start.

Figure 2:
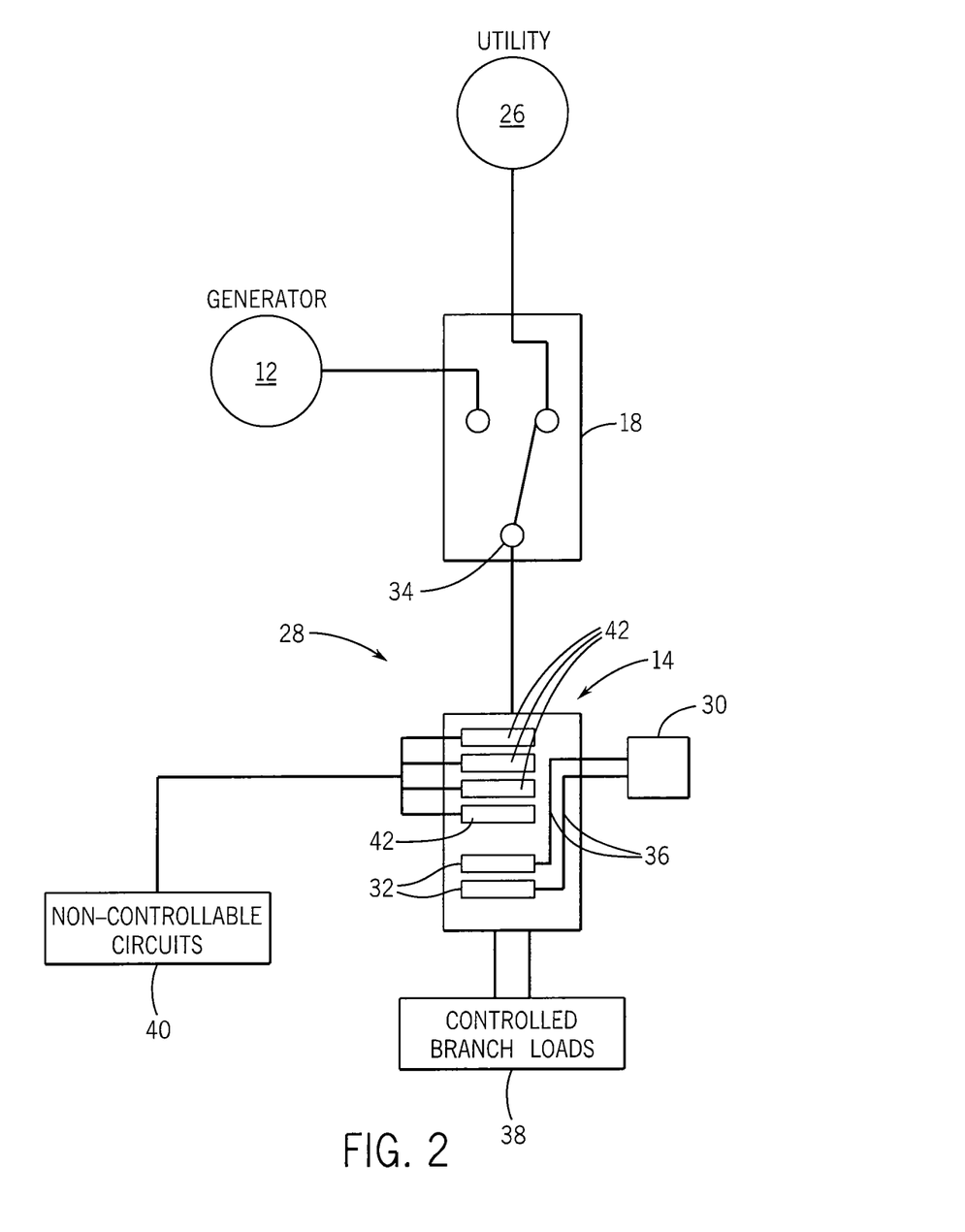
FIG. 2 is a schematic representation of a load management apparatus for use the power supply system of FIG. 1 according to an embodiment of the invention.

Referring now to FIG. 2, the present invention provides a load management apparatus 28 for use with the electrical generator 12 and transfer switch 18. The load management apparatus 28, which can be added to an existing power inlet arrangement 10, includes a control module 30, remotely controllable circuit breakers 32, and a current sensor 34. In one embodiment, the current sensor 34 is a current transformer. The current sensor 34 provides a current signal that is proportional to the AC current of the power output provided by the electrical generator 12 when the electrical generator is feeding power to the power transfer switch 18 and is proportional to the AC current of the power output provided by the utility power supply 26 when utility power supply is feeding electrical power to the power transfer switch 18. As known in the art, the transfer switch 18 switches the connection of the load center 14 between the electrical generator 12 and the utility power supply 26. For a typical home installation, the transfer switch 18 will be a 200 Amp switch with the current sensor 34 added to the load side the transfer switch 18. The current sensor 34 measures the current draw on the electrical generator 12 when the electrical generator 12 is feeding electrical power to electrical circuits ("electrical loads") of the power transfer switch 18.

The remotely controllable circuit breakers 32 are communicatively linked with the control module 30 by leads 36, which can be any conventional transmission wire used to transfer control signals. Alternately, the remotely controllable circuit breakers 32 and the control module 30 may each include wireless communication devices, e.g., transmitters, receivers, antennas, etc., for wirelessly transmitting control signals to the remotely controllable circuit breakers 32.

The remotely controllable circuit breakers 32 are preferably molded case circuit breakers that replace conventional circuit breakers of the load center 14. In this regard, the circuit breakers 32 are operably associated with selected electrical circuits 38 and in addition to providing switching also provide a circuit protection function.

In one embodiment, there is a remotely controllable circuit breaker 32 for each of the electrical circuits 38. Alternately, as shown in FIG. 2, selected electrical circuits 40 may not have a remotely controllable circuit breaker 32 associated therewith. In such an embodiment, the circuits 40 having a conventional circuit breaker 42 are not selectively connected and disconnected from the electrical generator 12 via commands received from the control module 30. Thus, these circuits would always be capable of imposing a load on the electrical generator 12 unless their circuit breakers 42 have been manually switched to an OFF position. It is contemplated that these "non-switchable" circuits would be for those circuits in which a homeowner, for example, would always want powered by the electrical generator 12 during utility power interruption, such as medical equipment, HVAC systems, security systems, sump pumps, and the like. It will be appreciated that the number of remotely controllable circuit breakers 32 can vary with each installation and must comply with the load calculation requirements required by the National Electrical Code, for example.

It is contemplated that current information can be acquired when utility power or the electrical generator is feeding power to the power transfer switch. In this regard, in one embodiment of the invention, the control module 30 periodically executes a learning cycle when utility power is providing electrical power to the power inlet box. While various types of learning processes are contemplated, in one preferred learning mode, the control module 30 controls the remotely controllable circuit breakers 32 to initially isolate their respective circuits 38 from the utility power supply. Thereafter, the control module 30 brings each load back online one at a time. Each circuit 38 is re-connected to the utility power supply and allowed to achieve a steady-state. Once steady-state is achieve, i.e., the current draw on the utility power supply has stabilized, the control module 30 reads the output of the current sensor 34 and stores the current value for the connected load in memory (not shown) as a load profile for the load. The load is then again isolated from the utility power supply. This process is then repeated for each of the remotely controllable loads until a load profile is stored for each of the loads. Preferably, the learning mode is carried out iteratively so that the load profiles are routinely updated to account for changes in the loading characteristics in the individual circuits.

As will be described more fully below, the present invention limits the number of inputs that is required to control the adding and shedding of loads on the electrical generator 12. In one preferred embodiment, the information required by the control module 30 to add and shed loads is the load profile for each load, the output for the electrical generator 12, and the rated capacity for the electrical generator 12. It is also contemplated that the control module 30 may be programmed to determine an optimal loading value, i.e., maximum efficiency value, for the electrical generator 12 based on the rated output for the electrical generator 12. For example, while the electrical generator 12 may be rated to support a 200 Amps draw, the control module 30 may set the optimal value at a percentage, e.g., eighty percent of the rated output and thus, for this example, limit the steady-state load on the electrical generator 12 to a 160 Amps draw.

Figure 3:
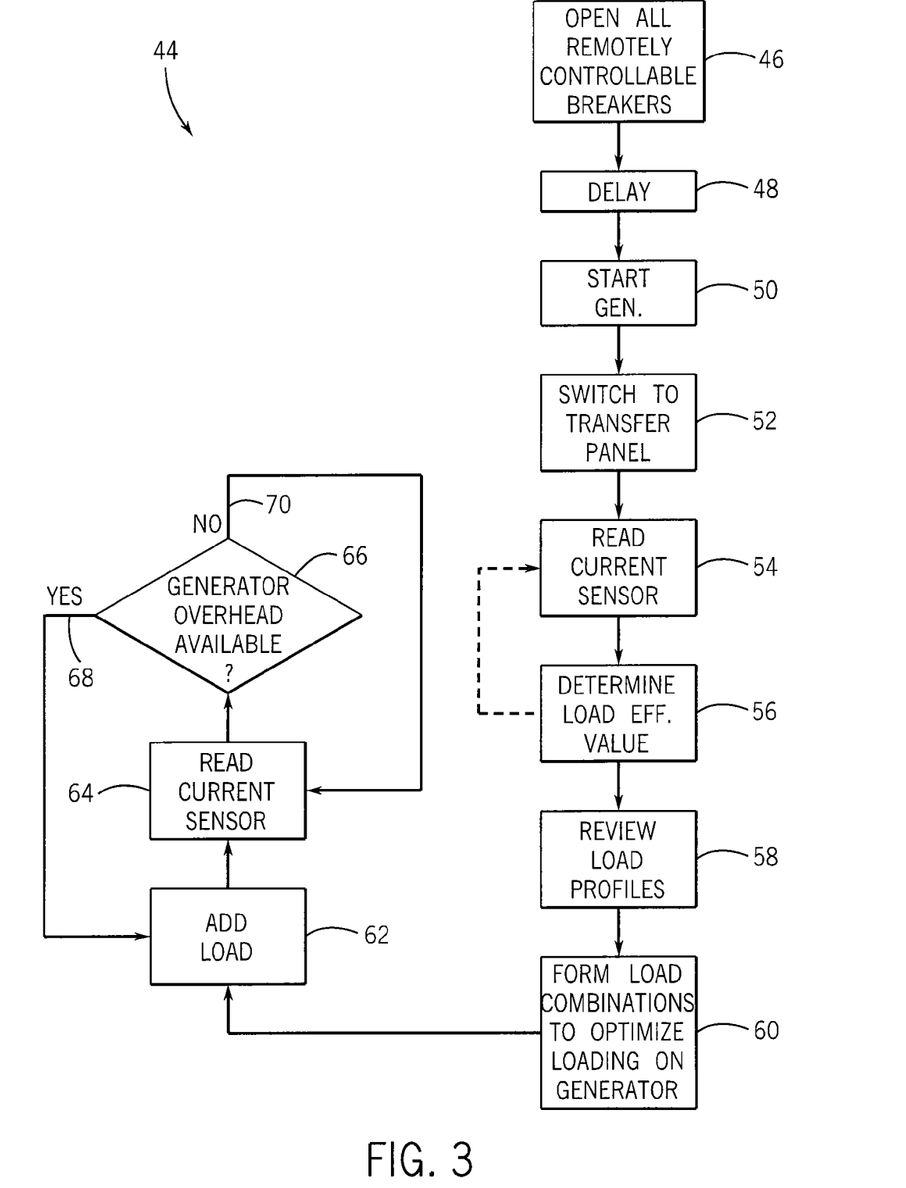
FIGS. 3 and 4 are flow charts setting forth the steps of load management processes according to one embodiment of the invention.

Referring now to FIG. 3, operation of the control module 30 upon the loss of utility power will now be described. It should be appreciated that the control module 30 may be programmed to operate differently upon the loss of utility power.

In the illustrated process 44, when a loss of utility power occurs, the control module 30 initially opens all remotely controllable circuit breakers 32 at block 46. After observing a preset delay period 48, the control module 30 then starts the electrical generator 12 at block 50. After the electrical generator 12 has warmed up and achieved a relative steady-state operation, the transfer switch 18 transfers the load, i.e., the load center 14, to receive electrical power from the electrical generator 12 at block 52. The control module 30 then reads the output of the current sensor 34 at block 54 to determine the available electrical power from the electrical generator 12. If programmed to do so, the control module 30 then determines a load efficiency value for the electrical generator 12 at block 56 from the available electrical power read at block 54. It will be appreciated, however, that the control module 30 may be programmed differently and thus limit loading of the electrical generator 12 at the available power level or some other derived value. For instance, it is contemplated that the control module 30 may include memory (not shown) that is loaded with data, such as in a look-up table (now shown) or performance curves (not shown) that provide a correlation between optimal generator efficiency and available generator output or overhead for the particular model electrical generator being used. Thus, it is contemplated that the memory of the control module 30 may be preloaded with performance curves or data for various models of electrical generators.

Once the loading limit on the electrical generator 12 is calculated, derived, or otherwise determined at block 54 or block 56, the control module 30 is then caused to begin bringing the remotely controllable loads online, i.e., loading the electrical generator 12. It will be appreciated that if the load center 14 is fitted with conventional circuit breakers 42, those loads, i.e., branch circuits, are automatically connected to the electrical generator 12 when utility power is unavailable and the electrical generator 12 is running. Thus, when the process 44 causes the control module 30 to begin bringing the remotely controllable loads online, the control module 30 must give consideration to the already-online loads on the electrical generator 12.

In a preferred embodiment, the remotely controllable loads are brought online one at a time so that the control module 30 can determine the impact each load has on the electrical generator 12. The order in which the control module 30 brings the loads online can be varied to accommodate consumer preferences or could be adaptive. For example, in one embodiment, the control module 30 sequentially brings the loads online with the larger loads, based on the load profiles stored in memory, being connected before the smaller loads. Alternately, a consumer may desire that the smaller loads be brought online before the larger loads.

In an adaptive system, the control module 30 is caused to determine a combination of loads that maximizes the available power from the electrical generator 12. Thus, in this embodiment, the process 44 causes the control module 30 to review the load profiles for all the known loads at block 58 and then iteratively groups various combinations of the loads together at block 60 to determine which loads to bring online. It is understood that various statistical analyses may be done to determine the various combinations for the control module 30 to consider. Further, it is contemplated that the loads may be assigned weighting factors based on consumer preference, for example, so that user-desired loads are given preferential treatment. It is further contemplated that other weighting factors may be assigned to each load. For example, seasonal information or time-of-day information may be used to weight a load to have a higher priority. Thus, for instance, the load that includes the home AC unit may be weighted more heavily during daytime hours in the summer months.

After a load combination that is believed to optimize loading on the electrical generator 12 has been determined at block 60, the control module 30 then adds the first load in the combination at block 62 by providing a suitable control signal to the corresponding remotely controllable circuit breaker 32. The control module 30 then reads the output of the current sensor 34 at block 64. The control module 30 then determines if additional generator overhead is available at block 66. If so 68, the control module 30 loops back to block 62 and adds the next load in the grouping. The process 44 then goes through blocks 64 and 66 until the additional generator overhead is not available. Thus, when additional generator overhead is not available 70, the control module 30 loops back to block 64 and maintains the status quo until additional generator overhead becomes available.

It will thus be appreciated that as the control module 30 commands the remotely controllable circuit breakers 32 to sequentially bring the remotely controllable loads online, the control module 30 continues to read the output of the current sensor 34 so that the number, or combination, of loads to be brought online can be adjusted as the output of the electrical generator 12 changes.

Figure 4:
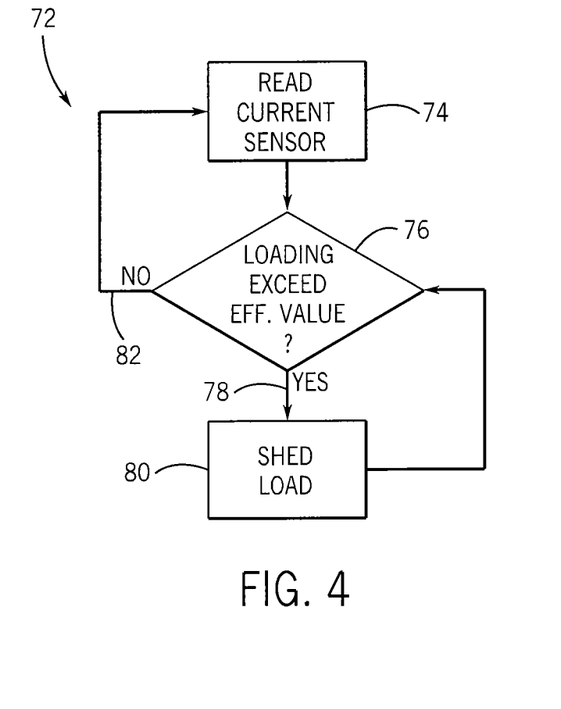

Referring now to FIG. 4, a shed process 72 is carried out by the control module 30 whenever a remotely controlled circuit 38 is loading the electrical generator 12. The shed process 72 is designed to shed loads whenever there is a drop the output of the electrical generator 12. In this regard, the shed process 72 begins with reading the output of the current sensor 34 at block 74. The control module 30 then determines at block 76 if the loading on the electrical generator 12 exceeds the load efficiency value determined at block 56. If yes, line 78, the control module 30 then sends a command signal to one of the remotely controllable circuit breakers 32 to move to an OPEN or OFF position so as to electrically isolate the corresponding circuit 38 from electrical generator. In a preferred embodiment, the last added load is the first load shed in an overload condition; however, it is understood that the invention is not so limited and that other schemes may be used to determine the order by which loads are shed, such as shedding loads based on load values. If the loading value does not exceed the efficiency value, line 82, the process loops back to block 74. However, if a load is shed at block 80, the process 72 causes the control module 30 to loop back to block 74 and re-determine if the loading on the electrical generator 12 exceeds the load efficiency value, block 76. If it still does, then another load must be shed at block 80. This loop continues until the load on the electrical generator 12 is below the load efficiency value.

It is further contemplated that the control module 30 could determine various combinations to connect to the electrical generator 12 during a learning mode in which the control module 30 selectively connects/disconnects various combinations of the loads from the utility power supply 26. These "combination" load profiles may then be stored in memory (not shown) and used to control which loads are brought online should utility power become unavailable.

Referring again briefly to FIG. 3, it will be appreciated that if the control module 30 is programmed to derive a load efficiency value as a function of the available electrical power of the electrical generator 12, then the control module iteratively updates the load efficiency value as the output of the electrical generator 12 changes. Thus, for example, if the available output of the electrical generator 12 should drop or rise, the control module 30 determines a new load efficiency value and carries out the remainder of the process 44 with the updated value.

It is contemplated that the control module 30 may be communicatively linked with auto-controlled loads, such as a thermostatically controlled AC unit, so that the control module 30 can bring loads online or shed loads based on the operational status of such load. Thus, for instance, if the load containing the home AC unit, which is thermostatically controlled, is initially connected to the electrical generator 12 and is running to provide cooling air to the home is shut-off as commanded by the thermostat (not shown), the control module 30 receives a signal (either across a transmission wire or through a wireless communication) from the thermostat which notifies the control module 30 that the AC has been temporarily shut-off. The control module 30 then adds new load(s) to make up for the drop in loading on the electrical generator 12. However, to ensure that the electrical generator 12 is not overloaded when the thermostat causes the AC unit to run again, the control module 30 receives a signal from the thermostat when the thermostat instructs the AC to resume operation. Upon receipt of such a signal, the control module 30 sheds loads from the electrical generator 12. In one embodiment, the control module 30 sheds loads in a last on/first off manner. Of course, the invention is not so limited and that loads could be shed according to a different protocol.

In one embodiment, the control module 30 is contained within a housing (not shown) of relatively small size that allows it to be securely mounted to the customer's service panel, e.g., transfer panel 18. The control module 30 may have its own battery (not shown) or may be powered off the battery (not shown) of the electrical generator 12.

As noted above, in one embodiment of the invention, the control module 30 determines which loads to add and shed based on the output of the electrical generator 12. In this regard, it will be appreciated that the present invention provides a load management system that is independent of the size of the electrical generator 12. The load management system adapts to instantaneous output of the electrical generator and determines load profiles for each load on the generator. Thus, when a new load is added to the system, the control module 30 will learn the load profile for the new load during a learn mode and then consider the new load the same as other loads on the system. In this regard, the invention, unlike other load management systems that require rewiring and/or priority changes when a new load is added to the system, adapts to the new load without requiring rewiring or reprioritizing.

Many changes and modifications could be made to the invention without departing from the spirit thereof. The scope of these changes will become apparent from the appended claims.

The invention claimed is:

1. A method of managing electrical power draw on an electrical generator, comprising:
operatively connecting a plurality of controllable electrical loads to the utility power source with corresponding remotely controllable circuit breakers, the remotely controllable circuit breakers controllable by a controller;
operatively connecting a first electrical ad to a utility power supply a circuit breaker, the circuit breaker free from controller control;
individually prioritizing the plurality of controllable electrical loads based on electrical loading placed by each of the plurality of controllable electrical loads on the utility power supply that normally supplies electrical power to the first electrical load and the plurality of controllable electrical loads;
upon an interruption the utility power supply, electrically connecting the first electrical load and the plurality of controllable electrical loads to the electrical generator so that the electrical generator can supply electrical power to the first electrical load and the plurality of controllable electrical loads; and
if a loading on the electrical generator exceeds a preset loading value, electrically isolating the plurality of controllable electrical loads from the electrical generator and then individually reconnecting the plurality of controllable electrical loads to the electrical generator based on an order of preference from the prioritization of the plurality of controllable electrical loads, wherein the plurality of controllable loads are reconnected in the order of preference until the loading by the controllable electrical loads as the controllable electrical loads are being connected reaches the preset loading value.

2. The method of claim 1 wherein the plurality of electrical loads are reconnected in a stepped order of preference such that one electrical load is electrically reconnected to the electrical generator at a time.

3. The method of claim 1 further comprising setting the preset loading value based on an available electrical power from the electrical generator.

4. The method of claim 3 further comprising monitoring a power output value of the electrical generator and adjusting the present loading value in response to changes in available electrical power.

5. The method of claim 1 wherein prioritizing the plurality of controllable electrical loads further includes identifying critical loads and ranking the critical loads such that the order of preference first causes critical loads to he reconnected to the electrical generator before non-critical loads.

6. The method of claim 5 wherein critical loads include circuits that provide electrical power at least one of AC units, refrigeration units, and medical equipment.

7. The method of claim 1 further comprising reiteratively re-prioritizing the plurality of controllable electrical loads when the plurality of electrical loads are being supplied electrical power by the utility power supply.

8. A load shedding apparatus for controlling the loading placed on an electrical generator by a first electrical load and a plurality of controllable electrical loads, wherein each electrical load has a load profile, the apparatus comprising:
   a current sensing device adapted to measure current output of an electrical generator;
   a circuit breaker connecting the first electrical load to the electrical generator;
   a plurality of remotely controllable switching devices operative to switchably connect the plurality of controllable electrical loads to the electrical generator; and
   a controller programmed to provide switching signals to the remotely controllable switching devices to individually connect the controllable electrical loads to the electrical generator so that a total loading placed on the electrical generator by the first electrical load and the connected controllable electrical loads does not exceed a preset overload value, and wherein the controller is further programmed to add or shed the controllable electrical loads so that the preset overload value is not exceeded and the total loading on the electrical generator is substantially at a preset efficiency value.

9. The apparatus of claim 8 wherein the controller is a programmable device having executable code that causes the controller to determine which controllable electrical loads to electrically connect to the electrical generator from an available power value for the electrical generator.

10. The apparatus of claim 9 wherein the controller is programmed to determine the preset overload value from a rated power output of the electrical generator.

11. The apparatus of claim 10 wherein the controller is programmed to electrically isolate all controllable electrical loads from the electrical generator upon the loss of utility power, and thereafter electrically reconnect the controllable electrical loads to the electrical generator in a stepped fashion based on learned load profiles for the plurality of controllable electrical loads.

12. The apparatus of claim 11 wherein the controller is programmed to execute a learning mode in which the load profiles for the plurality of controllable electrical loads are learned, and wherein the learning mode is carried out when the utility power supply is feeding electrical power to the plurality of controllable electrical loads.

13. The apparatus of claim 12 wherein the controller is further programmed to iteratively execute the learning mode at predefined intervals.

14. The apparatus of claim 13 wherein the controller is further programmed to cyclically add and shed controllable electrical loads from the utility power supply and determine one or more combinations of the controllable electrical loads that have a collective power draw approximate the preset efficiency value.

15. A power management module for managing load placed on an electrical generator that is supplying electrical power to a first electrical load and to a plurality of controllable electrical loads that are normally powered by utility power, the module comprising:
   a first input that receives a power supply value of electrical power available from the electrical generator:
   at least one second input that receives electrical load value for the first electrical load and the plurality of controllable electrical loads; and
   a processor that is programmed to adaptively add and shed controllable electrical loads from receiving electrical power from the electrical generator to maintain loading on the electrical generator at or below the power supply value.

16. The power management module of claim 15 wherein the first input includes a current transformer that measures current output of the electrical generator.

17. The power management module of claim 16 wherein the processor is further programmed to learn a load profile for each of the plurality of controllable electrical loads, and wherein the processor is programmed to learn the load profiles when utility power is supply electrical power to the plurality of controllable electrical loads.

18. The power management module of claim 17 wherein the processor is further programmed to learn a load profile for a new controllable electrical load when the new controllable electrical load is added to the plurality of controllable electrical loads.

19. The power management module of claim 15 further comprising a plurality of remotely controllable switches, wherein each switch is communicatively linked to the processor and operative to selectively connect and disconnect a connectable an electrical load from the electrical generator.

* * * * *